(12) United States Patent
Devillez (10) Patent No.: US 11,753,139 B2
(45) Date of Patent: Sep. 12, 2023

(54) AIRCRAFT PRESSURISED CABIN DOOR WITH INTERNAL FORCE-ABSORBING FRAME

(71) Applicant: LATECOERE, Toulouse Occitaine (FR)

(72) Inventor: Sabastien Devillez, Saint Jean (FR)

(73) Assignee: LATECOERE, Toulouse (FR)

( * ) Notice: Subject to any disclaimer, the term of this patent is extended or adjusted under 35 U.S.C. 154(b) by 182 days.

(21) Appl. No.: 17/435,829

(22) PCT Filed: Mar. 3, 2020

(86) PCT No.: PCT/EP2020/055554
§ 371 (c)(1),
(2) Date: Sep. 2, 2021

(87) PCT Pub. No.: WO2020/178283
PCT Pub. Date: Sep. 10, 2020

(65) Prior Publication Data
US 2022/0153401 A1    May 19, 2022

(30) Foreign Application Priority Data
Mar. 6, 2019 (FR) ..................................... 1902276

(51) Int. Cl.
*B64C 1/14*    (2006.01)
(52) U.S. Cl.
CPC .......... *B64C 1/1423* (2013.01); *B64C 1/1461* (2013.01)

(58) Field of Classification Search
CPC ....... B64C 1/14; B64C 1/1407; B64C 1/1423; B64C 1/1461
See application file for complete search history.

(56) References Cited

U.S. PATENT DOCUMENTS

| 4,720,065 | A |   | 1/1988 | Hamatani |                        |
|-----------|---|---|--------|----------|------------------------|
| 5,064,147 | A | * | 11/1991 | Noble   | B64C 1/1407 292/DIG. 31 |
| 5,577,781 | A | * | 11/1996 | Kallies | B64C 1/1407 292/195    |
| 6,168,114 | B1| * | 1/2001 | Erben    | B64C 1/143 49/153      |

(Continued)

FOREIGN PATENT DOCUMENTS

| CN | 106672200 | 5/2017 |
|----|-----------|--------|
| CN | 109229331 | 1/2019 |
| FR | 2928620   | 9/2009 |

*Primary Examiner* — Joshua J Michener
*Assistant Examiner* — Cindi M Curry
(74) *Attorney, Agent, or Firm* — Defillo & Associates, Inc.; Evelyn A. Defillo (57) ABSTRACT

An aircraft pressurized cabin door (1) having a fuselage panel (2) and a door structure (3) that includes: two circumferential beams (4) arranged on the lateral edges of the door (1); a plurality of longitudinal beams (5). Each longitudinal beam (5) is an open profile having an outer face to which the fuselage panel (2) is fixed and an inner face, the door structure (3) further including an internal force-absorbing frame (12) fixed to the inner face of each longitudinal beam (5), this internal force-absorbing frame (12) having a plurality of uprights (13) each extending opposite a circumferential beam (4), each upright (13) being fixed to several longitudinal beams (5).

18 Claims, 6 Drawing Sheets

(56) References Cited

U.S. PATENT DOCUMENTS

| | | | |
|---|---|---|---|
| 6,554,226 B2* | 4/2003 | Bold | B64C 1/1461 |
| | | | 244/129.5 |
| 8,523,110 B2* | 9/2013 | Schwinning | B64C 1/1407 |
| | | | 244/119 |
| 11,548,659 B2* | 1/2023 | Linde | B29C 66/112 |
| 11,597,493 B2* | 3/2023 | Gildas | E05F 7/02 |
| 2002/0000494 A1* | 1/2002 | Bold | B22C 9/10 |
| | | | 244/129.5 |
| 2002/0000817 A1 | 1/2002 | Bluem | |
| 2002/0043588 A1 | 4/2002 | Bold | |
| 2007/0007390 A1 | 1/2007 | Doerer | |
| 2009/0078826 A1 | 3/2009 | Haensch et al. | |
| 2009/0308977 A1* | 12/2009 | Larcher | B64C 1/1461 |
| | | | 244/129.5 |
| 2021/0070416 A1* | 3/2021 | Buchet | B64C 1/1423 |
| 2021/0262255 A1* | 8/2021 | Blum | E05B 83/00 |
| 2022/0363364 A1* | 11/2022 | Dubose | B64C 1/143 |

\* cited by examiner

AIRCRAFT PRESSURISED CABIN DOOR WITH INTERNAL FORCE-ABSORBING FRAME

CROSS REFERENCE TO RELATED APPLICATION

This application is a national stage entry of PCT/EP2020/055554 filed Mar. 3, 2020, under the International Convention and claiming priority over French Patent Application No. 1902276 filed Mar. 6, 2019.

TECHNICAL FIELD

The invention relates to the field of aeronautics and concerns an aircraft pressurized door.

BACKGROUND OF THE INVENTION

Aircraft, and in particular airplanes, are generally equipped with doors allowing persons and equipment to enter and exit the cabin. Since the cabin is pressurized, these doors must guarantee, during the flight, that the cabin is closed and that a significant pressure difference is maintained between inside the cabin and outside. The pressurized cabin doors include for that purpose a fuselage panel, also called "skin", which, when the door is closed, is placed in the continuity of the fuselage of the aircraft, and which acts as a barrier for maintaining the pressure difference. So that this fuselage panel can have an acceptable thickness in spite of the significant stresses due to the pressure difference, the door also includes a door structure formed of beams fixed to the fuselage panel so as to ensure its rigidity. This structure is connected to the fuselage when the door is closed, generally by means of stops in the case of doors whose load due to pressure is absorbed directly by contact of the door structure with the structure of the fuselage.

Furthermore, the cabin doors also generally support miscellaneous equipment such as door opening mechanisms or comfort and safety equipment. The door structure, as well as ensuring the rigidity of the door, must also be dimensioned to support these additional weights, which can be substantial.

The pressurized cabin doors are a critical safety element of an aircraft, as they guarantee that pressure is maintained inside the cabin. The door panels and the associated door structures are therefore dimensioned for a high level of safety.

Patent application FR2928620 describes an aircraft cabin door whose door structure comprises transversal beams and stringers, intersecting to form a rigid structure. The transversal beams and stringers are type IPN profiles. In the example described by that document, four stringers and six transversal beams intersect each other at a right angle and are fixed to each other, thereby forming a highly rigid structure.

Such a door structure is difficult and costly to manufacture, in particular because of the connections to make at the intersections between the stringers and the transversal beams. These connections require fasteners, additional parts or complex connections and also cause weight increases.

Furthermore, the intersection between the transversal beams and the stringers makes it difficult to manufacture this door in composite materials, for which making such intersections causes additional difficulty in assembly or in molding.

Patent application US2007007390 proposes to resolve some of the above-mentioned disadvantages by proposing a monolithic aircraft door made in one piece. Strong reinforcement ribs intersect at right angles over the entire inner surface of the door. Such a door also has a substantial rigidity, suited to its use in aeronautics, but remains of a significant complexity and manufacturing cost. Its weight is also substantial.

Patent application US2009/0078826 describes a pressurized cabin door made in composite materials and whose design is optimized for the use of these composite materials. The door comprises beams arranged at right angles to each other but not intersecting. The manufacturing process for such a door is simplified with respect to the processes evoked above and the implementation using composite materials is facilitated. However, supporting the skin of such a door involves the presence of hidden surfaces, which complicate the installation of supports for equipment and parts interfacing with the fuselage.

Patent applications US4720065 and US2002/043588 describe an aircraft door comprising two circumferential beams arranged on the lateral edges of the door and a plurality of longitudinal beams arranged between the circumferential beams.

Patent application CN109229331 describes a light panel for aircraft including a reinforcement structure.

SUMMARY OF THE INVENTION

The invention aims to improve aircraft pressurized cabin doors by proposing such a door combining significant rigidity allowing its use for aircraft flying at altitude with simplicity of implementation, which allows rapid and low-cost manufacturing, and which allows it to be made by any process and materials, including composite materials.

To that effect, the invention targets an aircraft pressurized door including a fuselage panel and a door structure, which comprises:

two circumferential beams arranged on the lateral edges of the door;

a plurality of longitudinal beams arranged between the circumferential beams in a longitudinal direction, each longitudinal beam extending from one circumferential beam to the other, the fuselage panel being fixed to the longitudinal beams. Each longitudinal beam is an open profile having an outer face to which the fuselage panel is fixed and an inner face, turned towards the inside of the cabin, the inner face and the outer face being substantially parallel, the door structure further including an internal force-absorbing frame fixed to the inner face of each longitudinal beam.

The pressurized cabin door can include the following additional characteristics, alone or in combination:

the internal force-absorbing frame connects the inner face of each longitudinal beam to the inner face of the neighboring longitudinal beam;

the two circumferential beams are open profiles having an outer face to which the fuselage panel is fixed and an inner face, turned towards the inside of the cabin, the inner face and the outer face being substantially parallel;

the longitudinal beams and the circumferential beams each include a web, the webs of the longitudinal beams being fixed to the webs of the circumferential beams;

the door includes a mechanical connection between each end of the longitudinal beams and a circumferential beam;

the internal force-absorbing frame connects the inner face of each longitudinal beam to the inner face of a circumferential beam;

the internal force-absorbing frame includes a plurality of uprights each extending opposite a circumferential beam, each upright being fixed to several longitudinal beams;

each upright includes a plurality of tie rods each extending in an oblique direction with respect to the longitudinal direction;

the oblique direction forms an angle between 30° and 60° with the longitudinal direction;

the tie rods are arranged as saw teeth;

the tie rods each have a first end zone and a second end zone, the tie rods being connected together two by two such that:

two tie rods are connected by their first end zone against the circumferential beam opposite which the corresponding upright extends;

two tie rods are connected by their second end zone at a distance from the circumferential beam opposite which the corresponding upright extends;

each tie rod extends between a fastening point on a longitudinal beam and another fastening point on a circumferential beam;

each tie rod extends between a fastening point on a longitudinal beam and another fastening point on a neighboring longitudinal beam;

the internal force-absorbing frame includes a plurality of cornices each including a first edge fixed to one of the circumferential beams and a second undulated edge;

each cornice has a succession of zones of bumps and zones of hollows fixed alternately on the inner faces of the longitudinal beams;

the circumferential beams include an inner face forming the cornices;

the door structure comprises a first set of longitudinal beams and a second set of longitudinal beams, the longitudinal beams being spaced by a pitch identical in each of these sets;

the longitudinal beams are substantially perpendicular to the circumferential beams;

the door structure comprises locking stops associated with one longitudinal beam out of two.

In the present description and in the claims, the adjective "longitudinal" refers to the longitudinal direction of the fuselage of the aircraft. The longitudinal beams are therefore beams extending on the door, parallel to the longitudinal axis in which the fuselage of the aircraft extends. Likewise, the adjective "circumferential" refers to the circumference of the fuselage of the aircraft. The circumferential beams are therefore beams that extend along a curve relative to the contour of a section of the fuselage of the aircraft. Likewise, the inner face of the fuselage panel designates the face that is on the cabin side, contrary to the outer face of the panel, which is turned to the outside.

Such a door ensures its rigidity without having recourse to intersecting beams. The beams that are arranged transversally to each other come into contact, the ends of one beam against the side of another beam, without intersecting. The junctions between beams are thereby simplified and the prior assembly of beams is also simplified. This arrangement is particularly suitable for embodiment in composite materials.

The invention furthermore allows the use of several manufacturing techniques, whereby different materials and implementation techniques can be used for the same door. The simplicity of the design makes it possible efficiently to implement the majority of techniques used in aeronautical construction, and to envisage technologies that are too complex for an intersecting beam structure of the prior art.

In spite of its simple assembly, the door has high rigidity allowing the fuselage panel to accommodate significant pressure differences between inside and outside the cabin.

The internal frame further provides the door structure with mechanical redundancy properties by making the inner faces of each longitudinal beam integral with another element such as the neighboring longitudinal beams and/or the circumferential beams, this being on the inner side, that is to say on the faces of these beams that are situated towards the inside of the cabin of the aircraft. This mechanical redundancy assists the achievement of the high safety level required in the field of aeronautics, by guaranteeing that a failure, such as a longitudinal beam fracture, is accommodated by other elements without detrimental deformation of the door structure and therefore without a negative impact on the ability of the fuselage panel to withstand the pressure difference between inside and outside the cabin.

BRIEF DESCRIPTION OF THE FIGURES

Other characteristics and advantages of the invention will emerge from the description that is made thereof below, as an indication and not at all limitative, with reference to the attached drawings, wherein.

DETAILED DESCRIPTION OF THE INVENTION

Figure 1:
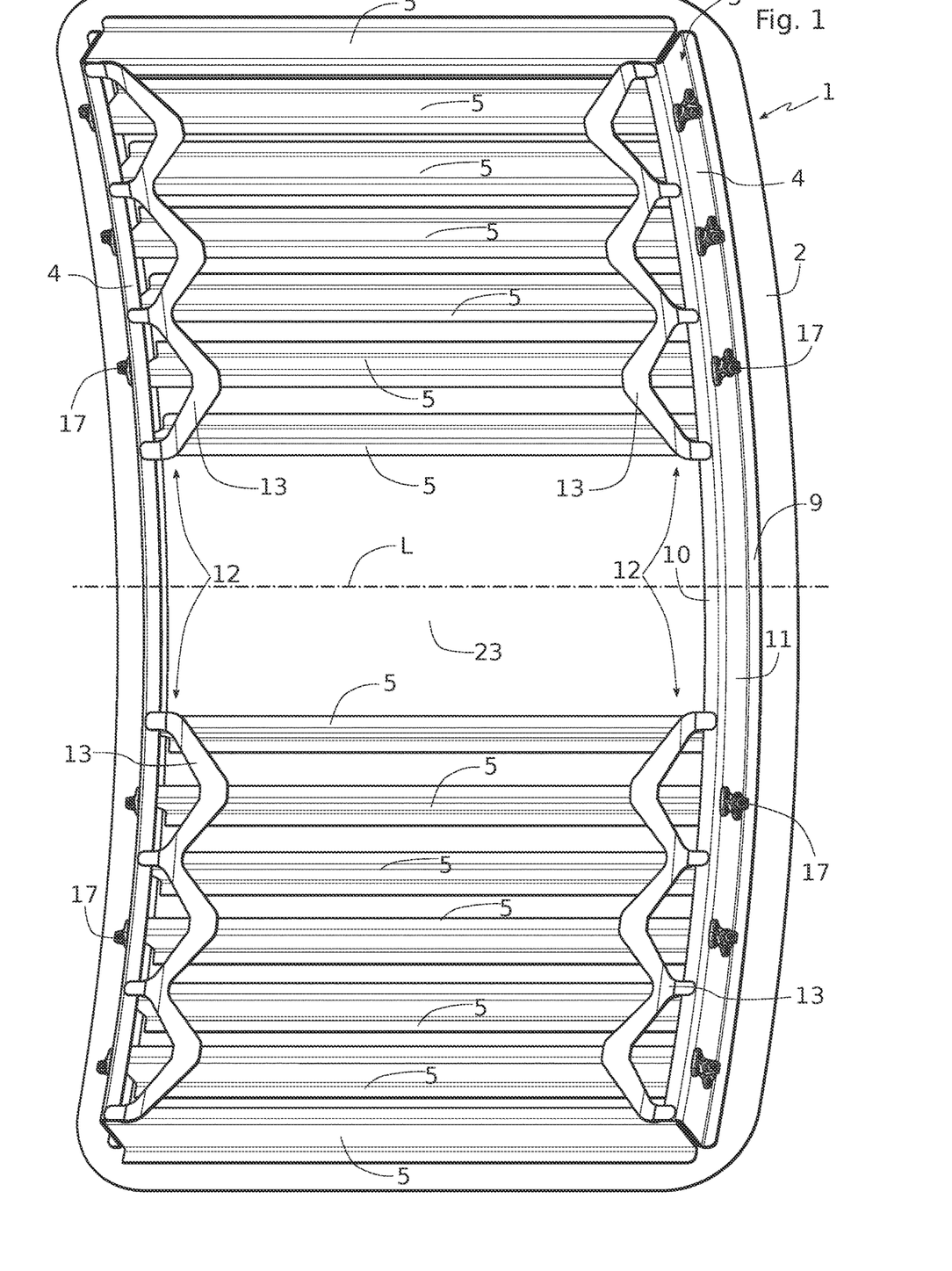
FIG. 1 shows in perspective an aircraft door according to a first embodiment of the invention.

FIG. 1 illustrates in perspective an aircraft pressurized cabin door 1 according to a first embodiment of the invention. In the present example, this door 1 is intended to close a corresponding opening made in the fuselage of an aircraft. The door 1 can be opened when the aircraft is on the ground to allow passengers to enter and exit, to constitute an emergency exit, an access hatch to the holds, or any other opening panel for aircraft. The cabin door 1 is associated in a conventional way with hinge mechanisms, opening and closing control mechanisms, as well as sealing devices (not illustrated).

The cabin door 1 comprises a fuselage panel 2 and a door structure 3 that reinforces the strength of the fuselage panel 2. When the cabin door 1 is closed, the fuselage panel 2 constitutes the outer surface of the aircraft, in the extension of the fuselage. The fuselage panel 2 can be made for example from a 2 to 5 millimeters thick aluminum sheet. In the present example, the fuselage panel 2 has a curve (see FIG. 2) that follows the shape of the fuselage of the aircraft whose section is generally substantially circular.

The door structure 3 is fixed to the inner part of the fuselage panel 2, that is to say, on the side of the inside of the cabin of the aircraft. The door structure 3 comprises two circumferential beams 4 that are fixed to the fuselage panel 2 on the lateral edges of the door 1. The circumferential beams 4 follow the circumferential curve of the fuselage panel 2, and more generally of the fuselage of the aircraft. In the described example, the circumferential beams 4 are vertical beams (with reference to the position shown on FIG. 1), each one being fixed close to a lateral edge of the fuselage panel 2.

The door structure 3 also comprises a plurality of longitudinal beams 5 that extend in the longitudinal direction L of the fuselage of the aircraft, that is to say with reference to the position of FIG. 1, substantially horizontally. Each longitudinal beam 5 includes a first end coming into contact with one of the circumferential beams 4, and includes a second end that comes into contact with the other circumferential beam 4. Each longitudinal beam 5 therefore extends perpendicularly to the circumferential beams 4, from one circumferential beam 4 to the other. The longitudinal beams 5 here are all parallel to each other and extend in a direction parallel to a longitudinal direction L, which is perpendicular to the two circumferential beams 4. As a variant, each longitudinal beam 5 extends simply transversally to the circumferential beams 4, as, in certain cases, the door 1 is mounted in evolving zones where the longitudinal beams are not perpendicular to the circumferential beams and are not parallel to each other. Each longitudinal beam web is connected to the web of the circumferential beam by shear recovery means described below according to two embodiments, a first embodiment targeting the addition of an additional force-absorbing angle, and a second embodiment targeting the attachment of a fold of the longitudinal beam to the circumferential beam.

Figure 2:
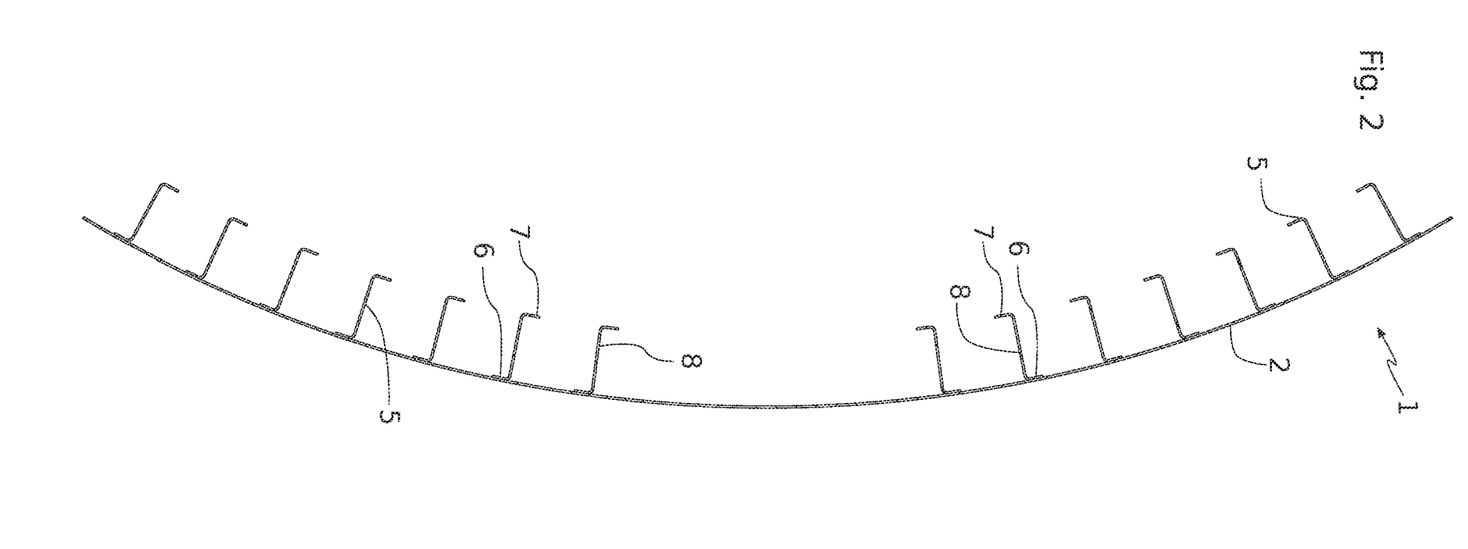
FIG. 2 shows in vertical section the door of FIG. 1.

With reference to FIG. 2, which illustrates the door 1 in profile, in vertical section, the longitudinal beams 5 are open profiles having an outer face 6 to which the fuselage panel 2 is fixed, and an inner face 7 that is turned towards the inside of the cabin.

Figure 3:
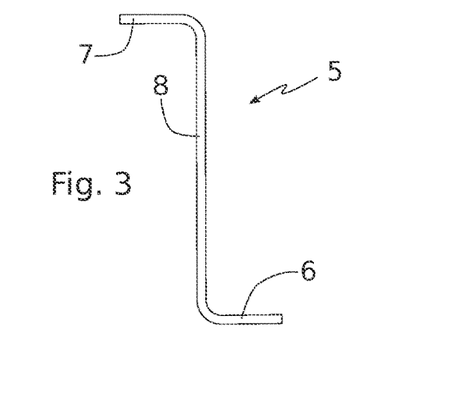
FIG. 3 shows the profile of the longitudinal beams of the door of FIGS. 1 and 2.

FIG. 3 shows the profile of one of the longitudinal beams 5. The inner face 7 and the outer face 6 are parallel here and are connected by a web 8 consisting of a single wall extending perpendicularly to the surface of the fuselage panel 2. In the present example, the longitudinal beams 5 are profiles such as those of FIG. 3.

Figure 4:
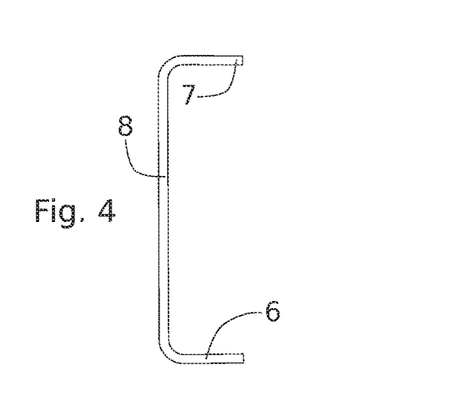
FIG. 4 illustrates a variant for the profile of FIG. 3.
Figure 5:
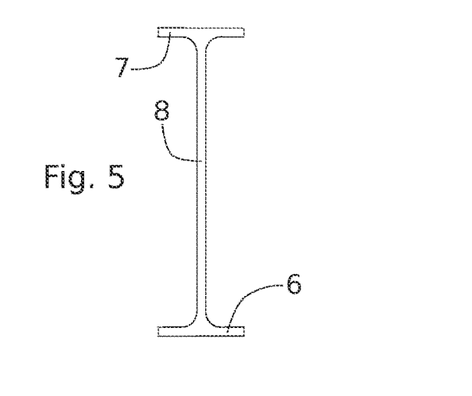
FIG. 5 illustrates another variant for the profile of FIG. 3.

FIGS. 4 and 5 illustrate embodiment variants of the profile of the longitudinal beams 5 applicable to all embodiments. Although, according to these variants, the profiles have different shapes, they include the same constituent elements that are identified with the same numbers of reference to the figures. Other open profiles having a substantially parallel outer face and inner face can of course be used.

In the present description and the claims, the term "open profile" designates a profile not having, in section, a closed space. For this reason, a tube of circular or rectangular section is not an open profile, whereas profiles whose section is U, V or T shaped, are examples of open profiles. These open profiles have the advantage of allowing access from all sides and therefore of being inspectable during maintenance and inspection operations, which boosts safety and the possibilities of checking the ageing of the door.

With reference to FIG. 1, the circumferential beams 4 are also made by open profiles including parallel outer faces 9 and inner faces 10. These faces 9, 10 are connected by a web 11. In the present example, the circumferential beams 4 have a profile, that is to say a section, identical to that of the longitudinal beams 5 (see FIG. 3).

The fuselage panel 2 is fixed, for example by bonding, welding or any other process, to the outer face 6 of each longitudinal beam 5 and to the outer face 9 of each circumferential beam 4.

Furthermore, the inner face 10 of the circumferential beams 4 is in contact with the inner face 7 of each longitudinal beam 5. The inner faces 10 of the circumferential beams 4 are preferably fixed to the longitudinal beams 5 at this contact zone. The inner face 10 of the circumferential beams 4 therefore constitutes a reinforcement rib, connecting, on each lateral edge of the door, all the ends of the longitudinal beams 5 at their inner face 7.

The door structure 3 also comprises an internal force-absorbing frame 12. In the example of FIG. 1, the frame 12 consists of a plurality of uprights 13, each extending opposite a circumferential beam 4. More precisely, in the example of FIG. 1, the frame 12 includes four uprights 13, two of these uprights 13 being arranged opposite one of the circumferential beams 4 and two other uprights 13 being arranged opposite the other circumferential beam 4.

Figure 6:
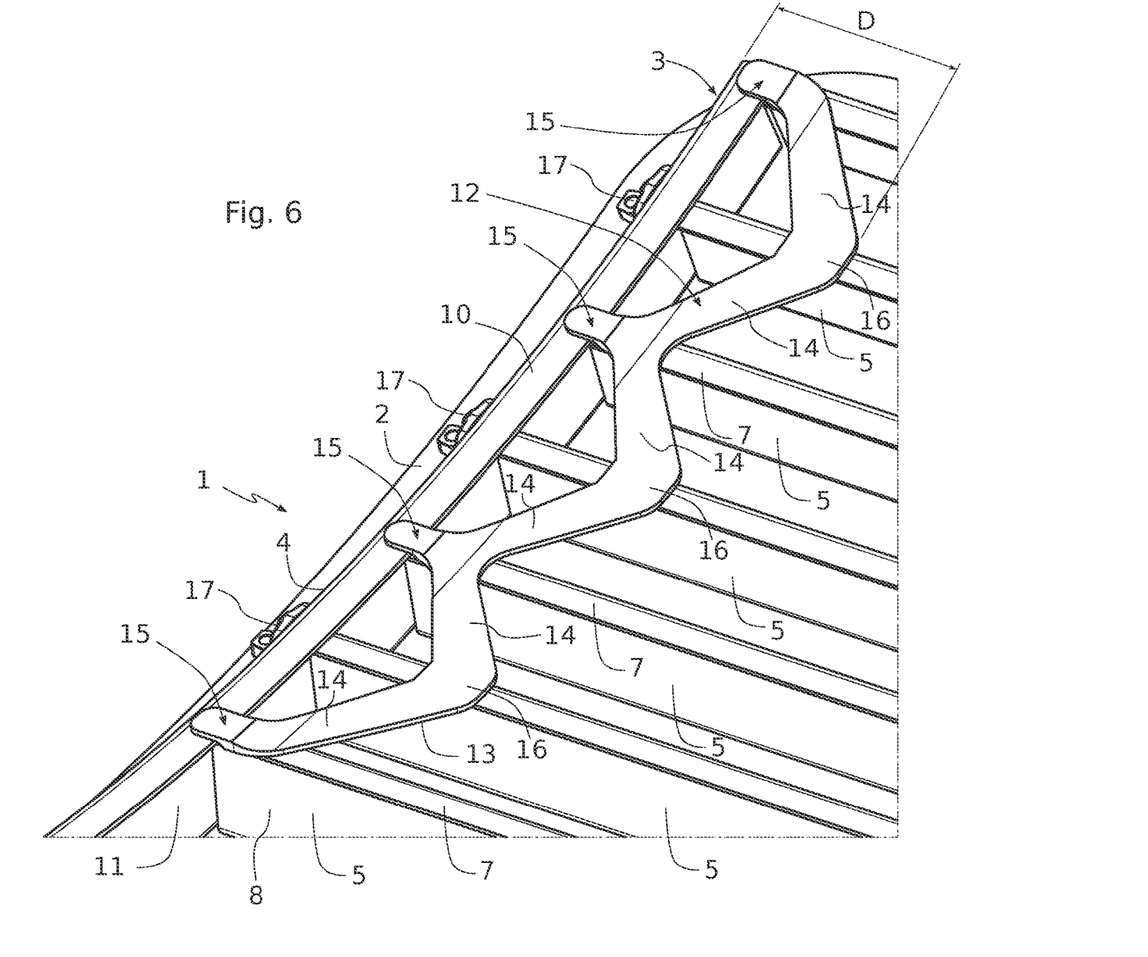
FIG. 6 is a detail view of FIG. 1.

FIG. 6 is a detail view of FIG. 1 showing one of the uprights 13. Each upright 13 includes a plurality of tie rods 14, each extending in an oblique direction with respect to the longitudinal direction L. The orientation of the tie rods 14 is qualified as oblique insofar as each tie rod 14 forms an angle between 30 and 60 degrees, and preferably 45 degrees, with the longitudinal direction L.

Furthermore, the uprights 13 are arranged in a zigzag, that is to say, the tie rods 14 are arranged as saw teeth. The ends of the tie rods 14 therefore meet up two by two, alternating either against the circumferential beam or at a distance from this circumferential beam.

Each tie rod 14, which is therefore arranged opposite a circumferential beam 4, therefore includes a first end zone 15, which is fixed at the same time to the inner face 10 of the circumferential beam 4 and fixed at the same time to the inner face 7 of a first longitudinal beam 5. Each tie rod 14 further includes a second end zone 16, which is fixed to the inner face 7 of a longitudinal beam 5 neighboring said first longitudinal beam 5. The saw tooth structure of the uprights 13 implies that the first end zone 15 of each tie rod 14 is in contact with the circumferential beam 4, while the second end zone 16 is at a distance D from this circumferential beam 4. This distance D is defined here as being the distance between the web 11 of the circumferential beam 4 and the edges of the tie rods 14, which meet up in their second end zone 16. This distance D is for example of the order of 10 centimeters in the case of an aircraft door.

The attachment of the internal frame 12 on the beams 4, 5 of the door structure 3 is achieved by bonding, welding or any other suitable means.

The invention lends itself particularly, but not exclusively, to making the door structure 3 in composite materials. The uprights 13 ensure that bending of these ends of the longitudinal beams 5 is blocked. The internal frame 12 allows absorption of force of the inner face of the longitudinal beams 5 on the inner part of the door structure 3, while the forces exerted by the fuselage panel 2 on the outer part of the door structure 3 are directly absorbed in turn by the attachment of the fuselage panel 2 on the door structure 3. This force absorption on the inner surfaces of the longitudinal beams allows the forces to be distributed among the longitudinal beams. Keeping the fuselage panel 2 compatible with the flight conditions, cabin pressurized, is therefore achieved with a structure, lightweight and able to be made at least partially in composite materials, according to a simplified process.

According to a preferred characteristic, the webs 8 of the longitudinal beams 5 is fixed to the webs 11 of the circumferential beams 4.

The door 1 is further equipped with stops 17 laterally fixed to the webs 11 of the circumferential beams 4. These stops 17 consist of recovery fittings on the fuselage and allow the door 1 to be locked in the closed position during the flight. In the present example, some longitudinal beams 5, hereinafter called "locking beams 5" are associated with a pair of stops 17, each stop 17 being arranged opposite an end of the locking beam 5. Each stop 17 is therefore fixed to the web 11 of a circumferential beam 4 at the point where the end of the locking beam 5 is situated.

Other longitudinal beams 5, hereinafter called "free beams 5", are not associated with stops 17.

The door structure 3 is assembled such that the free beams 5 alternate with the locking beams 5.

The locking beams 5 are beams on which the second end zones 16 of the tie rods 14 are fixed, at distance D. The free beams 5 in turn are therefore beams on which the first end zones 15 of the tie rods 14 are fixed. Most of the free beams 5 are therefore encompassed by two locking beams 5. The bending forces exerted on a free beam 5 are therefore absorbed obliquely by the tie rods 14 in the direction of a zone (the second end zones 16 of the tie rods 14), situated at a distance D of each stop 17.

Figure 7:
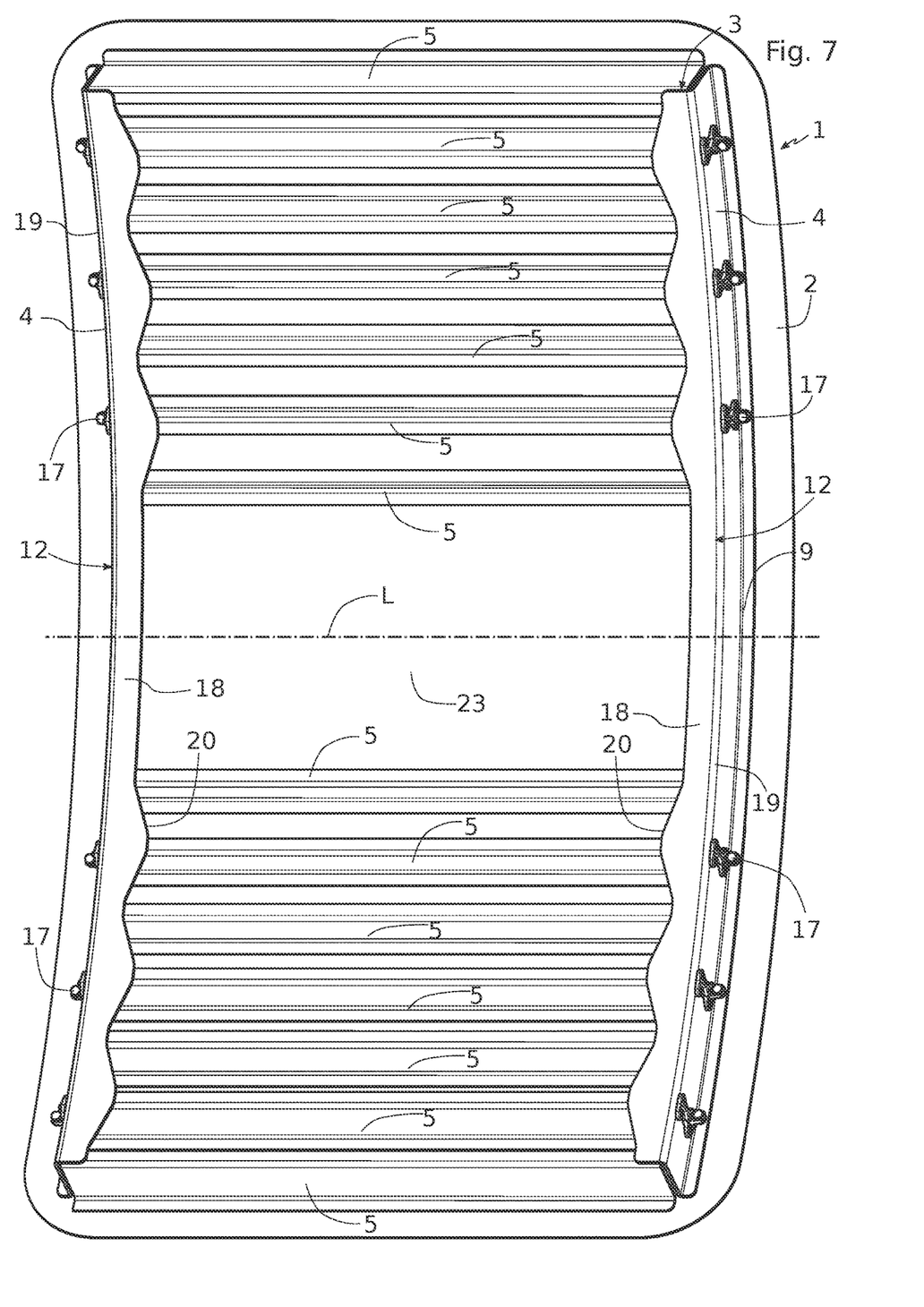
FIG. 7 shows in perspective an aircraft door according to a second embodiment of the invention.
Figure 8:
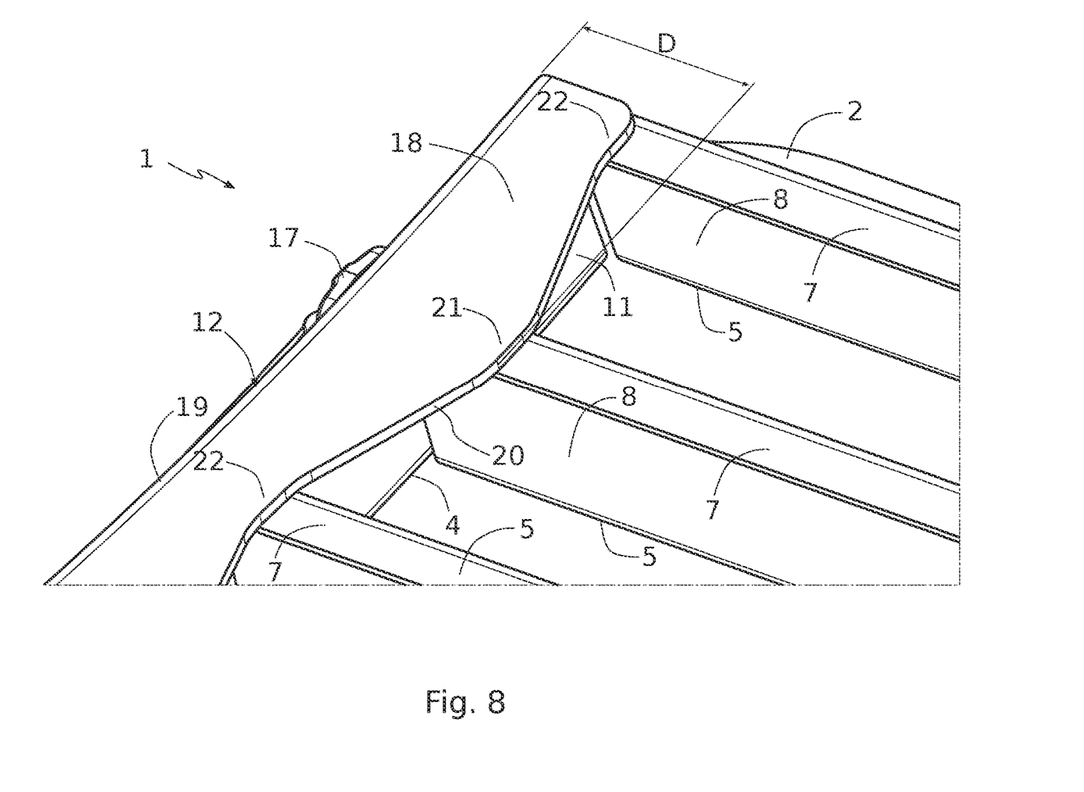
FIG. 8 is a detail view of FIG. 7.

FIGS. 7 and 8 are similar to FIGS. 1 and 6 and illustrate a second embodiment of the invention. The elements common to the first and second embodiments have the same numbers of reference to the figures. The door structure 3 here is equipped, the same as previously, with longitudinal beams 5 consisting of open profiles (examples in FIGS. 3 to 5) extending between two circumferential beams 4 to which the stops 17 are fixed, alternating relative to free beams 5 and locking beams 5.

According to this second embodiment, the internal force-absorbing frame 12 consists of a fold of the circumferential beams 4. The circumferential beams 4 here are also made from an open profile including an outer face 9 and a web 11, while a fold forms a cornice 18 that constitutes the inner face of the circumferential beam 4. The cornice 18 extends parallel to the outer face 9 of the circumferential beam 4, that is to say that the cornice 18 follows the same curve as the outer face 9, away from this outer face 9. The outer face 9 can be folded onto the fuselage panel 2, towards the outside of the door (as shown) or, as a variant, towards the inside of the door.

As the circumferential beams 4 are curved to follow the shape of the fuselage of the aircraft, the notion of parallelism between the inner faces 10 and the outer faces 9 of the circumferential beams 4 is relative to the fact that these faces 9, 10 follow the same curve and extend opposite each other at a constant distance.

The two folds 18 constitute two cornices forming the frame 12. These cornices have a first straight edge 19 and a second undulated edge 20 (see FIG. 8).

The straight edge 19 is qualified as straight as it extends along a line not having a curve in the longitudinal direction L (the only curve of the straight edge 19 is the circumferential curve of the corresponding circumferential beam 4). The undulated edge 20 is qualified as undulated as it extends along a line that undulates between closeness and distance with respect to the web 11 of the circumferential beam 4. The undulated edge 20 therefore includes zones called "zones of bumps 21" which are distant from the web 11, and zones called "zones of hollows 22", which are close to the web 11.

The cornice 18 is fixed to the inner face 7 of the longitudinal beams 5 in the zones of bumps 21 and the zones of hollows 22.

The distance between the zones of hollows 22 and the web 11 corresponds substantially to the width 10 of the circumferential beams 4 of the first embodiment. Likewise, the distance D between the zones of bumps 21 and the web 11 corresponds to the distance D between the web 11 and the second end zone 16 of the tie rods 14 of the first embodiment.

In this second embodiment, the absorption of oblique force is therefore achieved by the cornice 18 with the same mechanical properties and the same advantages as the first embodiment.

The longitudinal beams 5 to which the zones of bumps 21 are fixed are also locking beams 5, that is to say that they are associated with the locking stops 17. The longitudinal beams 5 to which the zones of hollows 22 are fixed are also free beams 5, that is to say that they are not associated with the locking stops 17.

With reference both to the first embodiment and the second embodiment, the invention allows the door structure 3 to be made with a plurality of sets of longitudinal beams 5, each set thereof having the same spacing, that is to say the same distance between the beams 5. In the illustrated examples, there are two sets of longitudinal beams 5 (an upper set of seven beams 5 and a lower set of seven beams 5, see FIGS. 1 and 7), these sets being separated by a space 23 allowing door equipment and miscellaneous devices to be accommodated there. The spacing of the beams 5 within each group can be adapted to the support desired for the fuselage panel.

Figure 9:
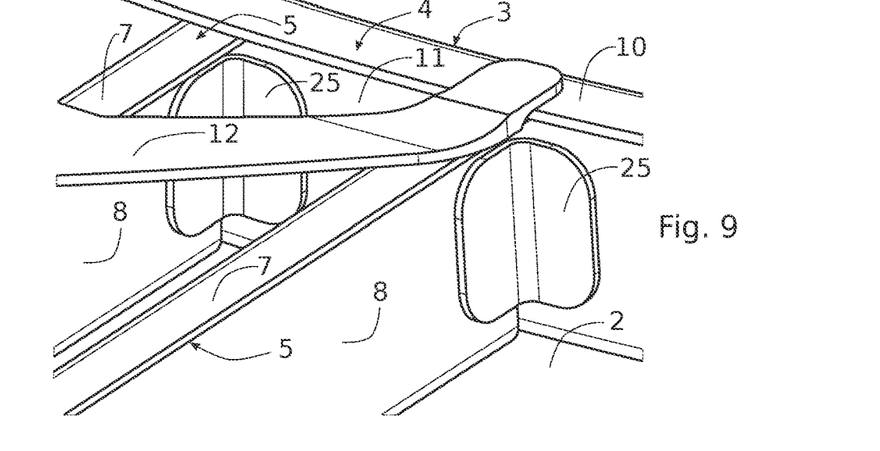
FIG. 9 illustrates a first variant of connection between the ends of the longitudinal beams and the circumferential beams.
Figure 10:
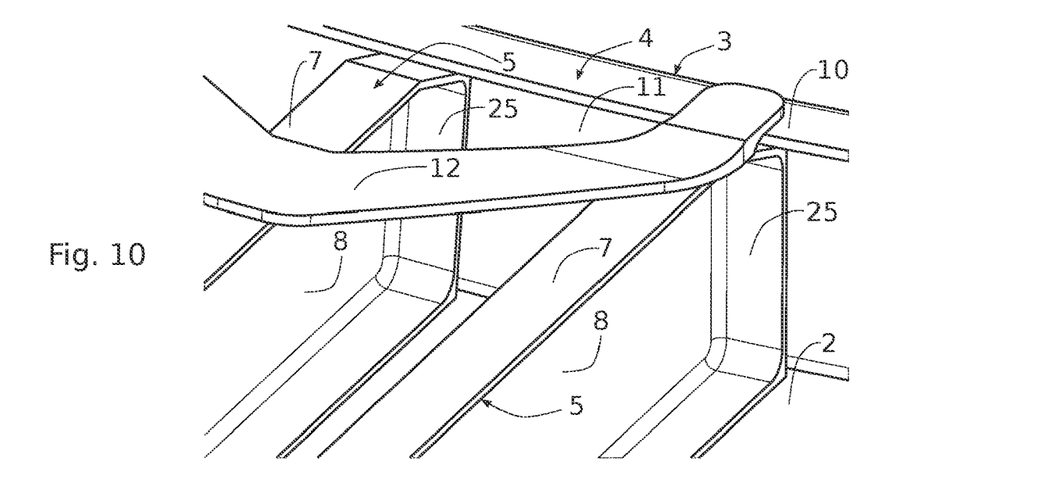
FIG. 10 illustrates a second variant of connection between the ends of the longitudinal beams and the circumferential beams.
Figure 11:
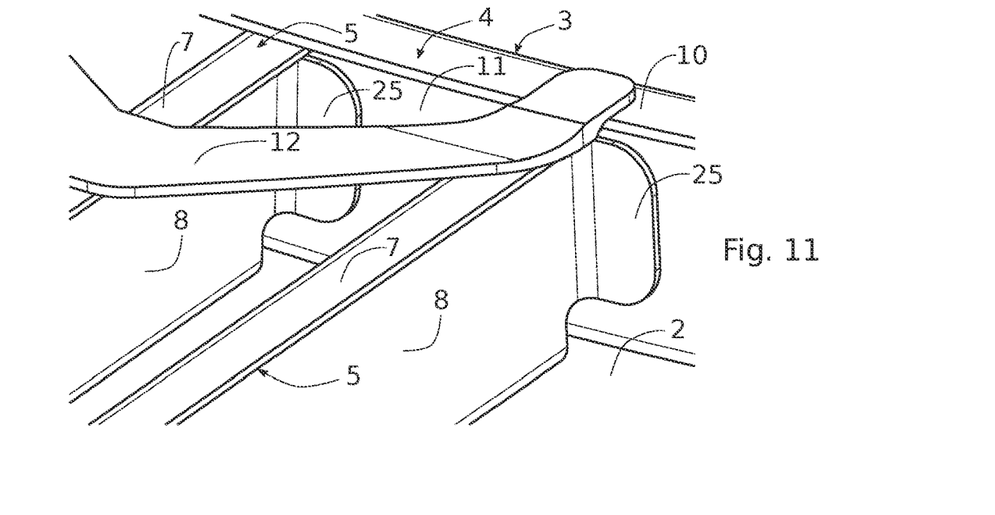
FIG. 11 illustrates a third variant of connection between the ends of the longitudinal beams and the circumferential beams.

Furthermore, whatever the embodiment of the internal force-absorbing frame, the door can, as a complement, include a mechanical connection between the ends of the longitudinal beams and the circumferential beams. FIGS. 9 to 11 illustrate three variants of such a mechanical connection 25. The elements of FIGS. 9 to 11 that are common with elements previously described have the same numbers of reference to the drawings. These three variants are illustrated in the context of the second embodiment described previously (this second embodiment illustrates the example where the internal frame is provided by the tie rods 14). However, these three variants are applicable to the first embodiment described previously or to any other embodiment of the internal frame.

With reference to FIG. 9, the mechanical connection 25 is provided by a plurality of added angle fittings, each connecting the web 8 of a longitudinal beam 5, at each end of the longitudinal beam 5, to the web 11 of a circumferential beam 4. These angle fittings can be fixed to the beams 4, 5 by any means such as bonding, welding etc.

With reference to FIG. 10, the longitudinal beams 5 here are beams whose profile is illustrated on FIG. 4. The mechanical connection 25 between the beams 4, 5 is provided here by an edge 25 situated at each end of the longitudinal beams 5, this edge 25 being placed in the continuity of the outer faces 6 and the inner faces 7 of the longitudinal beams 5. Each edge 25 is fixed to the corresponding circumferential beam 4.

With reference to FIG. 11, the mechanical connection 25 between the beams 4, 5 is provided here by a fold 25 situated at each end of the webs 8 of the longitudinal beams 5, this fold 25 being fixed to the corresponding circumferential beam 4.

Embodiment variants of the door structure 3 and in particular of the internal force-absorbing frame 12 can be envisaged without departing from the framework of the invention. In particular, the frame 12 can consist of any mechanical assembly allowing this force absorption on the inner faces 7 of the longitudinal beams 5, for example metal arms arranged obliquely between the longitudinal beams 5 and screwed onto these beams.

The invention claimed is:

1. An aircraft pressurized door (1) including a fuselage panel (2) and a door structure (3), the door structure comprising:
   two circumferential beams (4) arranged on lateral edges of the door (1);
   a plurality of longitudinal beams (5) arranged between circumferential beams (4) in a longitudinal direction (L), each longitudinal beam (5) extending from one of the circumferential beam (4) to the other, the fuselage panel (2) being fixed to the longitudinal beams (5);
   wherein each longitudinal beam (5) is an open profile having an outer face (6) to which the fuselage panel (2) is fixed and an inner face (7), turned towards an inside of the cabin, the inner face (7) and the outer face (6) being parallel,
   the door structure (3) further including an internal force-absorbing frame (12) fixed to the inner face (7) of each longitudinal beam (5), the internal force-absorbing frame (12) including a plurality of uprights (13) each extending opposite a circumferential beam (4), each upright (13) being fixed to several of the longitudinal beams (5).

2. The door as claimed in claim 1, wherein the internal force-absorbing frame (12) connects the inner face (7) of each longitudinal beam (5) to the inner face (7) of the neighboring longitudinal beam (5).

3. The door as claimed in claim 1, wherein the two circumferential beams (4) are open profiles having an outer face (9) to which the fuselage panel (2) is fixed and an inner face (10), turned towards the inside of the cabin, the inner face (10) and the outer face (9) being substantially parallel.

4. The door as claimed in claim 3, wherein the longitudinal beams (5) and the circumferential beams (4) each include a web (8, 11), the webs (8) of the longitudinal beams (5) being fixed to the webs (11) of the circumferential beams (4).

5. The door as claimed in claim 4, wherein the door includes a mechanical connection (25) between each end of the longitudinal beams (5) and a circumferential beam (4).

6. The door as claimed in claim 3, wherein the internal force-absorbing frame (12) connects the inner face (7) of each longitudinal beam (5) to the inner face (10) of a circumferential beam (4).

7. The door as claimed in claim 1, wherein each upright (13) includes a plurality of tie rods (14) each extending in an oblique direction with respect to the longitudinal direction (L).

8. The door as claimed in claim 7, wherein the oblique direction forms an angle between 30° and 60° with the longitudinal direction (L).

9. The door as claimed in claim 7, wherein the tie rods (14) are arranged as saw teeth.

10. The door as claimed in claim 9, wherein the tie rods (14) each have a first end zone (15) and a second end zone (16), the tie rods (14) being connected together two by two, such that:
    two tie rods (14) are connected by their first end zone (15) against the circumferential beam opposite which the corresponding upright (13) extends;
    two tie rods (14) are connected by their second end zone (16) at a distance D from the circumferential beam opposite which the corresponding upright (13) extends.

11. The door as claimed in claim 7, wherein each tie rod (14) extends between a fastening point on a longitudinal beam (5) and another fastening point on a circumferential beam (4).

12. The door as claimed claim 7, wherein each tie rod (14) extends between a fastening point on a longitudinal beam (5) and another fastening point on a neighboring longitudinal beam (5).

13. The door as claimed in claim 1, wherein the internal force-absorbing frame (12) includes a plurality of cornices (18) each including a first edge (19) fixed to one of the circumferential beams (4) and a second undulated edge (20).

14. The door as claimed in claim 13, wherein each cornice (18) has a succession of zones of bumps (21) and zones of hollows (22) fixed alternately on the inner faces (7) of the longitudinal beams (5).

15. The door as claimed in claim 13, wherein the circumferential beams (4) include an inner face forming the cornices (18).

16. The door as claimed in claim 1, wherein the door structure (3) comprises a first set of longitudinal beams (5) and a second set of longitudinal beams (5), the longitudinal beams (5) being spaced by a pitch identical in each of these sets.

17. The door as claimed in claim 1, wherein the longitudinal beams (5) are perpendicular to the circumferential beams (4).

18. The door as claimed in claim 1, wherein the door structure (3) comprises locking stops (17) associated with one longitudinal beam (5) out of two.

* * * * *